(No Model.)
D. E. ASHBY.
FRUIT JAR.
No. 333,717. Patented Jan. 5, 1886.
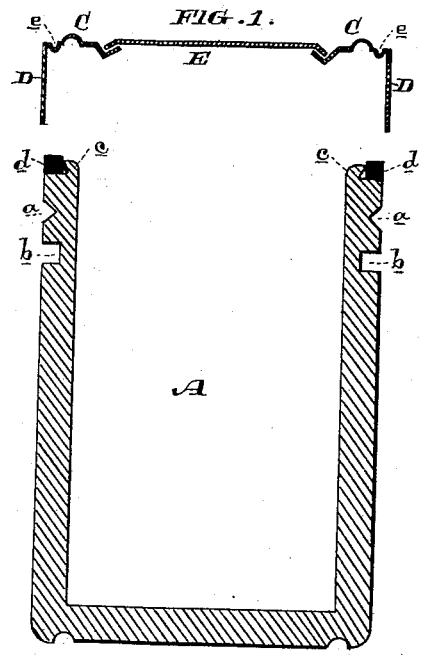
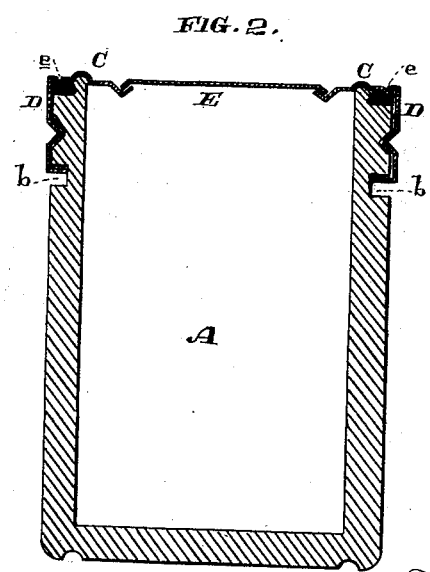
Witnesses,
Geo H. Strong.
J. H. Krouse.
Inventor
D. E. Ashby.
By Dewey & Co.
Attorneys

UNITED STATES PATENT OFFICE.

DELMAR E. ASHBY, OF SAN FRANCISCO, CALIFORNIA.

FRUIT-JAR.

SPECIFICATION forming part of Letters Patent No. 333,717, dated January 5, 1886.

Application filed October 7, 1885. Serial No. 179,269. (No model.)

*To all whom it may concern:*

Be it known that I, DELMAR E. ASHBY, of the city and county of San Francisco, State of California, have invented an Improvement in Fruit-Jars; and I hereby declare the following to be a full, clear, and exact description of the same.

My invention has for its object the hermetical sealing of canned fruits, vegetables, and other goods.

It consists of a combination of devices hereinafter explained and described.

Referring to the accompanying drawings for a more complete explanation of my invention, Figure 1 is a view of a jar, showing the elastic or rubber ring in position on its top and the cap removed from it. Fig. 2 is a view showing the parts all in position.

A represents a glass vessel formed with two grooves, $a$ and $b$, around its upper part, as shown. The top of the jar is of considerable thickness, and the inner edge projects upward, forming a narrow flange, as shown at $c$, so as to leave a flat ledge around its outside, and somewhat lower than this inner flange. Upon this ledge the rubber or elastic ring $d$ is placed, and the cap C, which has a downwardly-projecting exterior flange or rim, D, is fitted to slip down over the top of the jar. This cap C is corrugated, so as to produce an annular upwardly-curved ridge which will fit over the inner flange, $c$, of the vessel, while just outside of this is a depression, $e$, forming a corresponding projection on the interior of the cap, which rests upon the rubber or elastic ring $d$, and when the cap is pressed downward by a suitable clamp the rubber is pressed firmly in the space between the flange $c$ and the rim D of the exterior metal cap. The lower edge of this rim or flange is then turned inwardly into the groove or channel $b$ in the body of the jar, and the collar is also indented, so as to fit the groove or channel $a$, thus drawing the cap down firmly upon the rubber ring or packing $d$ and making a perfectly-tight joint.

My present invention differs from the former one allowed to me July 17, 1885, from the fact that in the former case the rubber packing extended down the side of the jar and was pressed into the grooves or channel corresponding with $a$; but in the present invention a ledge with an interior groove is formed upon the top of the jar, upon which the rubber ring is placed, and is compressed upon this upper edge without extending downward along the side of the jar. The center of the cap C may have the usual opening, E, and supplemental cap for the introduction of the fruit or other material, and this may be removed or replaced without in any way interfering with the exterior flanged cap and joint.

Having thus described my invention, what I claim as new, and desire to secure by Letters Patent, is—

A jar having the grooves $a$ and $b$ upon its side, a lip, $c$, projecting upwardly around the inner periphery of the top and forming an exterior ledge, in combination with a rubber or elastic ring fitting said ledge, a cap provided with an annular upwardly-curved ridge fitting the lip $c$, a depression, $e$, for engaging and compressing the elastic ring, and a downwardly-projecting flange or rim, the lower edge of which is bent or indented into the grooves in the sides of the jar, substantially as herein described.

In witness whereof I have hereunto set my hand.

DELMAR E. ASHBY.

Witnesses:
C. D. COLE,
J. H. BLOOD.